United States Patent Office 3,432,273
Patented Mar. 11, 1969

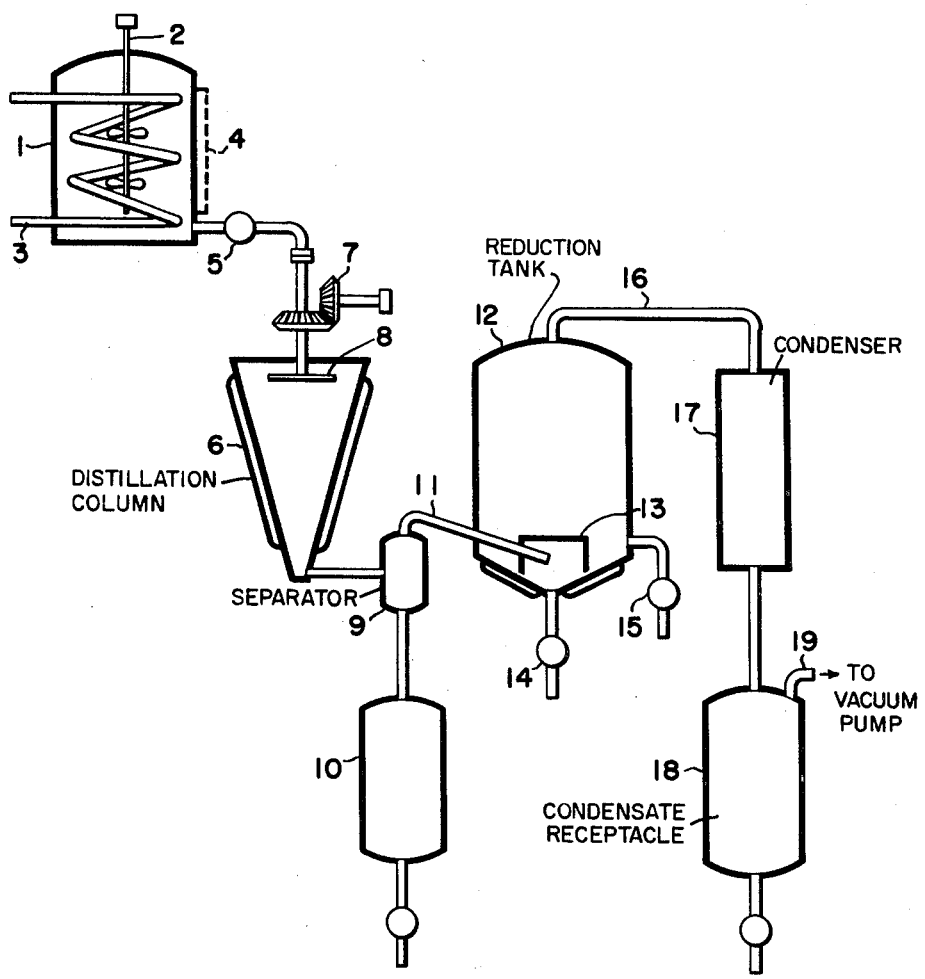

3,432,273
APPARATUS FOR PRODUCING HYDROQUINONE
Yuichi Kono, Shigeru Matsumoto, and Masaru Yoshikawa, Kanagawa-ken, Japan, assignors to Fuji Shashin Film Kabushiki Kaisha, Kanagawa-ken, Japan, a corporation of Japan
Original application Sept. 17, 1963, Ser. No. 309,554. Divided and this application Dec. 6, 1966, Ser. No. 599,544
Claims priority, application Japan, Oct. 17, 1962, 37/44,957
U.S. Cl. 23—263                           1 Claim
Int. Cl. B01d 3/00

ABSTRACT OF THE DISCLOSURE

An oxidation tank for oxidizing aniline to benzoquinone, a wet-wall type distillation column having an inverted cone shaped wall equipped with a heating jacket, a separator for separating benzoquinone from the mixture leaving the bottom of the distillation column, a reduction tank for reducing benzoquinone to hydroquinone with iron powders, and a condenser system for withdrawing steam from the reduction tank.

---

This application is a division of our copending application Ser. No. 309,554 filed Sept. 17, 1963, and now abandoned.

The present invention relates to an apparatus for the production of pure hydroquinone from aniline. More particularly, it relates to an improved apparatus for the production of pure hydroquinone by the oxidation of aniline with an oxidizing agent and by the reduction of thus formed benzoquinone with iron powders.

Hitherto, as an industrial production of hydroquinone, a process has been generally adopted in which an aniline sulfate solution containing an excessive amount of sulfuric acid is treated at a low temperature with a suitable oxidizing agent, such as, manganese dioxide or a bichromate, to form benzoquinone and iron powders are added into thus formed solution containing the benzoquinone to produce hydroquinone.

The crude hydroquinone solution produced as above usually contains approximately 4% of the produced compound. It is concentrated and cooled to obtain crude crystalline hydroquinone, which, however, cannot have any marketability, since it contains as impurities the reaction by-products as shown in the following reaction formulas:

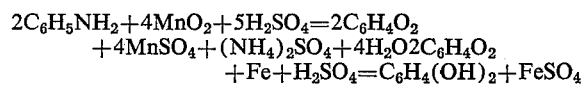

$2C_6H_5NH_2 + 4MnO_2 + 5H_2SO_4 = 2C_6H_4O_2$
    $+ 4MnSO_4 + (NH_4)_2SO_4 + 4H_2O 2C_6H_4O_2$
        $+ Fe + H_2SO_4 = C_6H_4(OH)_2 + FeSO_4$

Also, manganese sulfate obtained as the by-product contains ferrous sulfate, and the manganese sulfate obtained in crystalline form upon concentration of the solution has only limited applications.

An object of the present invention is to provide an improved and simplified apparatus for producing hydroquinone in a pure state.

Thus, this invention relates to an apparatus for producing hydroquinone from aniline comprising an oxidation tank for oxidizing aniline to form a mixture of reaction products including benzoquinone, an inverted cone shaped distillation column having heated walls, means for introducing the mixture at the top of said column so that the mixture will flow down the distillation column on the surface of the heated walls to separate the benzoquinone from the other reaction products in the mixture by steam distillation, a reduction tank containing a dispersion of iron powder in water, and means to introduce the benzoquinone to the reduction tank whereby the benzoquinone is reduced to hydroquinone.

Now the present invention will be described with reference to the accompanying drawing showing an embodiment of the apparatus of this invention. An oxidation tank 1 is equipped with an agitator 2 and a cooling coil 3. In the tank, aniline sulfate is oxidized for about 15 hours at a low temperature, e.g., at 9° C. with manganese dioxide or a bichromate to benzoquinone. All the means of the apparatus following a distilling column 6 of an inverted-cone-shape are operated at a pressure of about 550 mm. Hg by means of a decompression pump.

The distillation column 6 is provided with a steam heating jacket for heating the inverted cone shaped wall of the column and has in an upper section thereof a rotary disc 8 which is rotated at a rate of 50–100 r.p.m. by means of rotary gear 7 and an electric motor (not shown). The tapered bottom of the distillation column 6 is connected to a vapor-liquid separator 9. The flow of the oxidized solution from the bottom of the oxidation tank 1 is regulated by means of a gauge 4 and a valve 5. The oxidized solution supplied to the column is scattered onto the upper inside wall of the column by means of the rotary disc and is, therefrom, caused to run down in a thin layer along the wall while being heated thereon. The oxidized solution then enters the separator 9, where a vaporous mixture of benzoquinone and steam is separated from the oxidized solution and the remaining solution enters a receptacle 10 connected to the bottom of the separator 6. The vaporous mixture thus separated passes through a conduit 11 into a reduction tank 12 containing an aqueous dispersion of iron powders for reducing benzoquinone to hydroquinone. The reduction tank 12 is equipped with a bottom jacket, where, if necessary, a cooler may be mounted to collect benzoquinone. The iron powder dispersion has been previously charged into the reduction tank through a conduit having a valve 15, and the tank 12 is also equipped with a cyclone type distributor 13 at the lower section of the tank through which the vaporous mixture is introduced into the dispersion. The cyclone type distributor 13 has an inverted cup-like structure through the side wall of which the end of the conduit is opened in the distributor in a tangential direction to said wall. The stream of benzoquinone and steam introduced in the distributor 13 through the conduit is revolved rapidly in the distributor and sprayed uniformly and violently into the aqueous dispersion of iron powders over the lower end of the wall of the distributor 13, whereby benzoquinone is reduced effectively and immediately to hydroquinone upon contact with the iron powders.

The solution inside the reduction tank 12 is kept at 50 to 90° C. by means of the bottom jacket, and the temperature is maintained constantly while the apparatus is in operation.

Usually the pressure inside the distilling column 6 in operation is higher than that in the reduction tank 12 by 60 to 100 mm. Hg. From the benzoquinone-steam stream separated in the distillation column 6 and introduced into the reduction tank 12, only benzoquinone is captured and reduced while the steam is led through a conduit 16 into a condenser 17, wherein the steam is condensed and collected in a receptacle 18 connected to the bottom of the condenser. The receptacle 18 is kept at a reduced pressure by means of a vacuum pump (not shown) connected to the receptacle 18 through a conduit 19, thereby enabling the passage of steam from the reduction tank 12 into the condenser 17 and passage of condensed steam into the receptacle 18. By heating of the bottom jacket of the reduction tank in operation, the solution inside is gradually concentrated, and when the distillation at 6 is concluded, the hydroquinone concentration reaches about 30%. While hot, the solution is passed through a valve 14 for filtration, thereby to separate iron dust and its oxides therefrom. The mother liquor is stabilized with addition of dilute sulfuric acid and a sulfite solution, and then is cooled, when pure white hydroquinone in crystalline form free from impurities is obtained. It is dehydrated and dried to a finished product.

The apparatus of this invention is not confined to the embodiment shown and described above, but many other variations are possible. For example, a rotary disc such as 8 may be replaced by a pipe provided with numerous minute holes and attached to the upper portion of the surrounding wall of 6, thereby enabling the reacting solution to flow through the perforation and run down along the surrounding wall of the tank. Also, while the steam containing benzoquinone is caused to run out of the lower portion of the column 6 into the separator 9 together with the oxidized solution as shown by the drawing, the outlet for the benzoquinone-containing steam may not necessarily be the same as the outlet for the oxidized solution, and the former may be separately provided on the upper portion of the column 6.

According to the invention, highly pure hydroquinone is readily obtained without requiring any special refining process. Furthermore, manganese dioxide obtained as a by-product takes the form of crystals free from ferrous salt, and can have extensive applications.

EXAMPLE

| | | |
|---|---|---|
| Water | l | 7500 |
| Sulfuric acid, 60°Bé. | kg | 2500 |
| Aniline | kg | 500 |
| Manganese dioxide, 65% | kg | 1870 |

An apparatus as shown in the drawing was used, wherein a mixture of the above composition was caused to react at 9° C. for 18 hours, into an oxidized solution containing approximately 4% of benzoquinone.

The solution was permitted to flow down over about 7 to 8 hours into a distilling column with a heating area of 18 m.² and with a steam pressure of 1.02 atm. inside the heating jacket. The steam containing benzoquinone was led into the reduction tank which was filled beforehand with 300 l. of water wherein 400 kg. of iron dust finer than 200 mesh in grain size, as dispersed. The temperature was kept at about 70° C. during the reducing operation.

The aqueous solution containing about 30% of hydroquinone obtained as above was filtrated and separated from the iron dust and its oxides. The mother liquor was stabilized with addition of limited quantities of dilute sulfuric acid and a sulfite solution, and cooled, when 475 kg. of pure hydroquinone was obtained (with a yield of over 80%).

What is claimed is:

1. An apparatus for producing hydroquinones from aniline comprising an oxidation tank for oxidizing aniline to provide a solution of oxidation products including benzoquinone, an inverted cone shaped distillation column having means for heating the wall thereof, means for introducing the solution of oxidation products to the top section of said distillation column so that the solution will flow down along the heated wall of the column in the form of a thin layer, means to heat the thin layer to evolve steam and benzoquinone vapors from the solution, separator means connected to the bottom of the distillation column for separating the benzoquinone together with steam from the solution withdrawn from the bottom of the distillation column, a reduction tank connected to the separator means for reducing benzoquinone to hydroquinone and containing an aqueous dispersion of iron powders, conduit means connected to the separator means for conducting an overhead stream of benzoquinone and steam and discharging it into the bottom of the tank, means in the bottom of the reduction tank including a cyclone shaped distributor having a lower wall portion disposed adjacent the bottom of said reduction tank for receiving and causing the discharging stream of benzoquinone and steam from the separator means to be revolved about and substantially uniformly sprayed into the lower portion of the reduction tank and intimately contacted with the iron powders, means to maintain a constant temperature of 50–90° C., in the reduction tank, condenser means connected to an upper portion of the reduction tank to receive and condense steam as overhead therefrom, vacuum pressure creating means communicating with the the condenser, and valve-controlled conduit means connected to the bottom of the reduction tank to withdraw mother liquor for treatment to recover hydroquinone.

References Cited

UNITED STATES PATENTS

| | | | |
|---|---|---|---|
| 1,500,618 | 7/1924 | Heuser | 202—236 X |
| 1,594,296 | 7/1926 | Lee | 202—236 X |
| 2,148,669 | 2/1939 | Zabriskie | 260—396 |
| 2,624,747 | 1/1953 | Davy | 260—396 |
| 2,799,715 | 7/1957 | Lohr | 260—621 X |
| 3,280,009 | 10/1966 | Ackermann et al. | 202—236 X |

NORMAN YUDKOFF, *Primary Examiner.*

F. E. DRUMMOND, *Assistant Examiner.*

U.S. Cl. X.R.

159—13; 202—236; 203—89; 260—396, 621